(12) United States Patent
Stolboushkin et al.

(10) Patent No.: US 11,326,432 B2
(45) Date of Patent: *May 10, 2022

(54) SELECTIVE FLOW CONTROL USING CAVITATION OF SUBCOOLED FLUID

(71) Applicants: Eugene Stolboushkin, Houston, TX (US); Alexander Kendall, Houston, TX (US)

(72) Inventors: Eugene Stolboushkin, Houston, TX (US); Alexander Kendall, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/683,781

(22) Filed: Nov. 14, 2019

(65) Prior Publication Data

US 2021/0148204 A1    May 20, 2021

(51) Int. Cl.
*E21B 43/24*    (2006.01)
*E21B 43/25*    (2006.01)

(52) U.S. Cl.
CPC ........ *E21B 43/2406* (2013.01); *E21B 43/255* (2013.01)

(58) Field of Classification Search
CPC .......................... E21B 43/2406; E21B 43/255
See application file for complete search history.

(56) References Cited

U.S. PATENT DOCUMENTS

| | | | |
|---|---|---|---|
| 9,022,119 B2 * | 5/2015 | Sims | E21B 43/2406 |
| | | | 166/303 |
| 2013/0048274 A1 * | 2/2013 | Schultz | E21B 43/003 |
| | | | 166/244.1 |
| 2016/0369571 A1 * | 12/2016 | Banerjee | E21B 43/2406 |
| 2019/0178068 A1 * | 6/2019 | Stolboushkin | E21B 33/1208 |
| 2021/0238939 A1 | 8/2021 | Stolboushkin et al. | |

* cited by examiner

*Primary Examiner* — Silvana C Runyan
(74) *Attorney, Agent, or Firm* — Cantor Colburn LLP (57) ABSTRACT

A fluid control device includes a housing, a fluid channel defined within the housing, the fluid channel having an inlet, and a flow control body disposed in the fluid channel, the flow control body tapering towards the inlet. The flow control body, in use, causes a fluid flowing through the fluid channel to flow into an annular fluid flow path within the fluid channel. The annular fluid flow path has a geometry selected based on a subcool of the fluid at a pressure of the fluid entering the fluid channel, and the geometry is selected to induce cavitation of the fluid to choke fluid flow through the fluid channel.

20 Claims, 5 Drawing Sheets

SELECTIVE FLOW CONTROL USING CAVITATION OF SUBCOOLED FLUID

BACKGROUND

Some forms of energy production involve a number of diverse activities from various engineering fields to be performed in a borehole. For example, exploration and production of hydrocarbons utilizes boreholes drilled into a resource bearing formation. Stimulation operations may be performed to facilitate hydrocarbon production from formations. Examples of stimulations include hydraulic fracturing, acid stimulation, steam injection, thermal injection and other operations that include injection of fluids and/or heat into a formation.

An example of a steam injection process is referred to as Steam Assisted Gravity Drainage (SAGD), which is a technique for recovering formation fluids such as heavy crude oil and/or bitumen from geologic formations, and generally includes heating a formation region through an injection borehole to reduce the viscosity of bitumen in the formation and allow it to flow into a recovery borehole. As used herein, "bitumen" refers to any combination of petroleum and matter in the formation and/or any mixture or form of petroleum, specifically petroleum naturally occurring in a formation that is sufficiently viscous as to require some form of heating or diluting to permit removal from the formation.

Other forms of energy production include geothermal production. Geothermal wells use heat present under the ground to extract usable energy. Water is pumped into the ground, absorbs energy, and is removed. The heat energy can be used for various purposes, such as driving turbines or otherwise generating electrical power.

SUMMARY

An embodiment of a fluid control device includes a housing, a fluid channel defined within the housing, the fluid channel having an inlet, and a flow control body disposed in the fluid channel, the flow control body tapering towards the inlet. The flow control body, in use, causes a fluid flowing through the fluid channel to flow into an annular fluid flow path within the fluid channel. The annular fluid flow path has a geometry selected based on a subcool of the fluid at a pressure of the fluid entering the fluid channel, and the geometry is selected to induce cavitation of the fluid to choke fluid flow through the fluid channel.

An embodiment of a method of controlling fluid flow includes receiving fluid in a liquid state at an inlet of a fluid channel in a housing of a flow control device, the fluid channel defined within the housing. The method also includes causing, by the flow control body, fluid flowing through the fluid channel to diverge into an annular fluid flow path within the fluid channel. The annular fluid flow path has a geometry selected based on a subcool of the fluid at a pressure of the fluid entering the fluid channel, and the geometry is selected to induce cavitation of the fluid to choke fluid flow through the fluid channel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
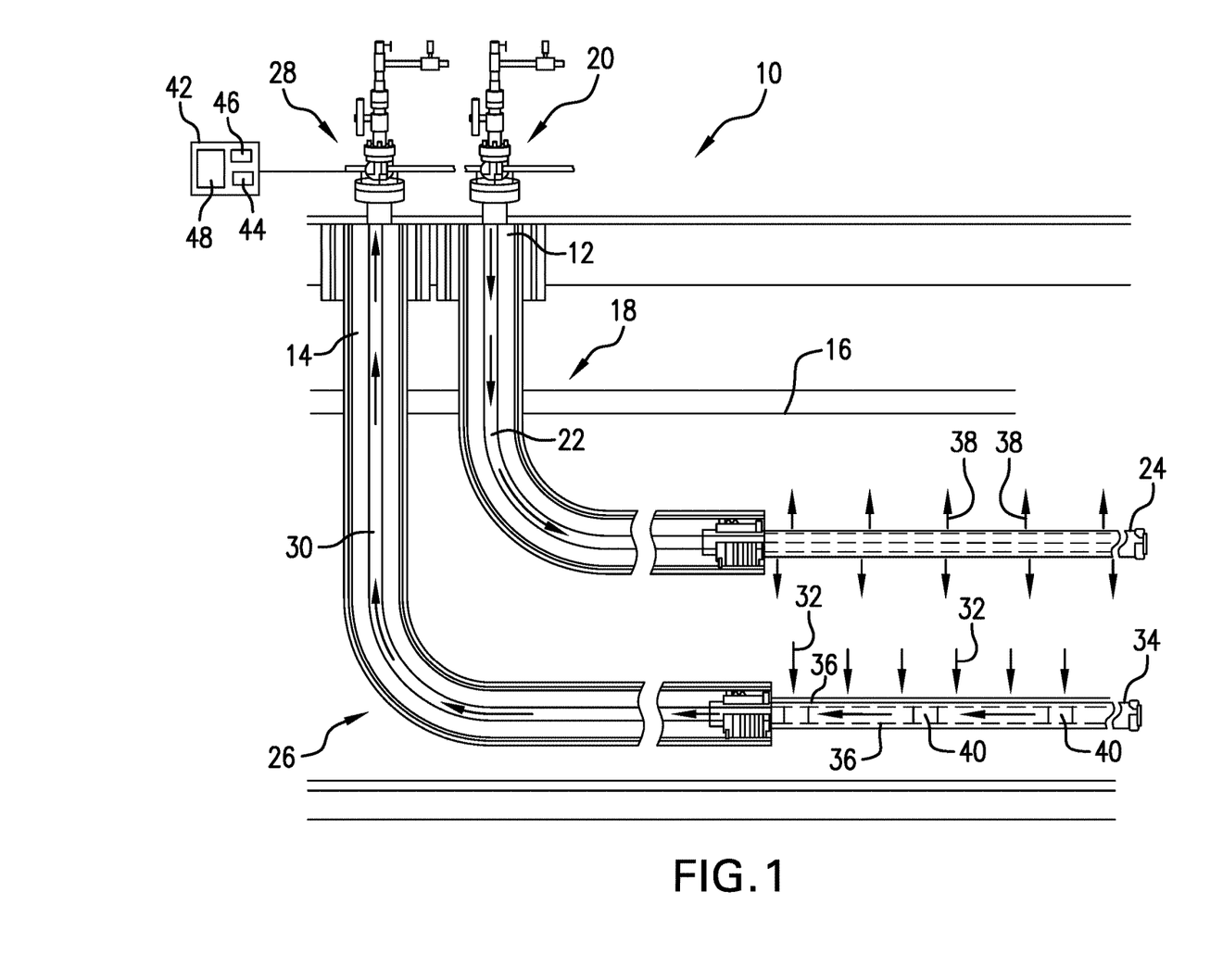
FIG. 1 depicts a resource recovery and exploration system configured for steam assisted gravity drainage (SAGD)

Referring to FIG. 1, an embodiment of a formation production system 10 includes a first borehole 12 and a second borehole 14 extending into a resource bearing formation such as an earth formation 16. In one embodiment, the formation is a hydrocarbon bearing formation or strata that includes, e.g., oil and/or natural gas. The first borehole 12 (also referred to as the injector borehole or injector well) includes an injection assembly 18 having an injection valve assembly 20, an injection conduit 22 and an injector 24. The injection valve assembly 20 is configured to introduce or inject a fluid (referred to as an injected fluid) such as a stimulation fluid, steam and/or hot water to the earth formation 16.

A production assembly 26 is disposed in the second borehole 14, and includes a production valve assembly 28 connected to a production conduit 30. The production conduit 30 is arranged radially inwardly of a casing 31. Production fluid 32, which may include hydrocarbons and other fluids (e.g., the injected fluid, water, non-hydrocarbon gases, etc.) flows into a collector 34 via a plurality of openings such as slots or holes, and flows through the production conduit 30 to a suitable container or other location. In one embodiment, the collector 34 includes a screen 36 (e.g., a sand screen) for preventing ingress of sand, particulates or other undesirable material.

In the embodiment of FIG. 1, the boreholes 12 and 14, the injector 24 and/or the collector 34 are disposed generally horizontally through a formation stratum, and can extend to various distances. However, embodiments described herein are not so limited, as the boreholes and/or components therein can extend along any selected path, which can include vertical, deviated and/or horizontal sections.

In one embodiment, the system 10 is configured as a steam injection system, such as a steam assisted gravity drainage (SAGD) system. SAGD methods are typically used to produce heavy oil (bitumen) from formations and/or layers, such as layers that are too deep for surface mining. The injected fluid in this embodiment includes steam 38, which is introduced into the earth formation 16 via the injector 24. The steam 38 heats a region in the formation, which reduces the viscosity of hydrocarbons therein, allowing the hydrocarbons to drain into the collector 34. For example, the injected steam condenses into a phase that includes a liquid water and hydrocarbon emulsion, which flows as a production fluid into the collector 34. A steam head (not separately labeled) may be maintained above the collector 34 to maintain the process of heating the region. Other embodiments of the system 10 may be configured to inject other fluids, such as hot water, surfactants, and/or petroleum products.

One or more flow control devices 40 are positioned at selected sections along the collector 34 to control the rate of fluid flow through the collector 34. Examples of flow control devices include active inflow control devices (ICDs), passive flow control devices, screens, valves, sleeves and others. Other components, such as packers, may be included in the collector 34 to establish production zones.

Surface and/or downhole components such as the injection valve assembly 20, the production valve assembly 28, the injector 24, the collector 34 and/or the flow control devices 40 may be in communication with a processing device, such as a downhole processor and/or a surface processing unit 42. For example, in SAGD systems, optical fibers can be incorporated into the injector 24 and/or the collector 34 for measurement and/or communication. The downhole processor and/or processing device includes components for performing functions including communication, measurement, data storage, data processing and/or control of steam or other fluid injection.

Various tools and/or sensors may be incorporated in the system. For example, one or more measurement tools can be deployed downhole for measuring parameters, properties or conditions of the borehole, formation and/or downhole components. Examples of sensors include temperature sensors, pressure sensors, flow measurement sensors, resistivity sensors, porosity sensors (e.g., nuclear sensors or acoustic sensors), fluid property sensors and others.

Although embodiments are discussed with reference to SAGD systems, they are not so limited and can be applied to any downhole system. For example, flow control devices as described herein may be utilized in geothermal energy extraction methods. One such method involves drilling two parallel horizontal boreholes. Cold fluid is injected into one borehole (the injector well) under pressure and migrates through a formation into another borehole (the producing well), from which the fluid is brought to the surface. As the fluid migrates into the producing well, it absorbs heat energy, and this heat energy is brought to the surface.

Natural differences in injection profile and reservoir conductivity can cause water (or other fluid) from the injector well to have uneven dwell times in the formation, resulting in water at the producer well having hot regions and cold regions. Cavitating flow control devices (e.g., inflow control devices including flow control bodies disposed within fluid channels) may be incorporated, for example, in the producer well to facilitate equalizing production. Flow control devices may be incorporated in the producer well at one or more production zones, and can passively increase and decrease flow to each zone and serve to even out the temperature profile. As discussed in more detail below, a cavitating inflow control device accelerates fluid, causing the static pressure to drop. When the static pressure drops to the saturation pressure for fluid of a given temperature, the mass flow rate is choked. In this way, hot spots can be suppressed by choking the inflow at that zone. This redirects fluid to adjacent zones.

Figure 2:
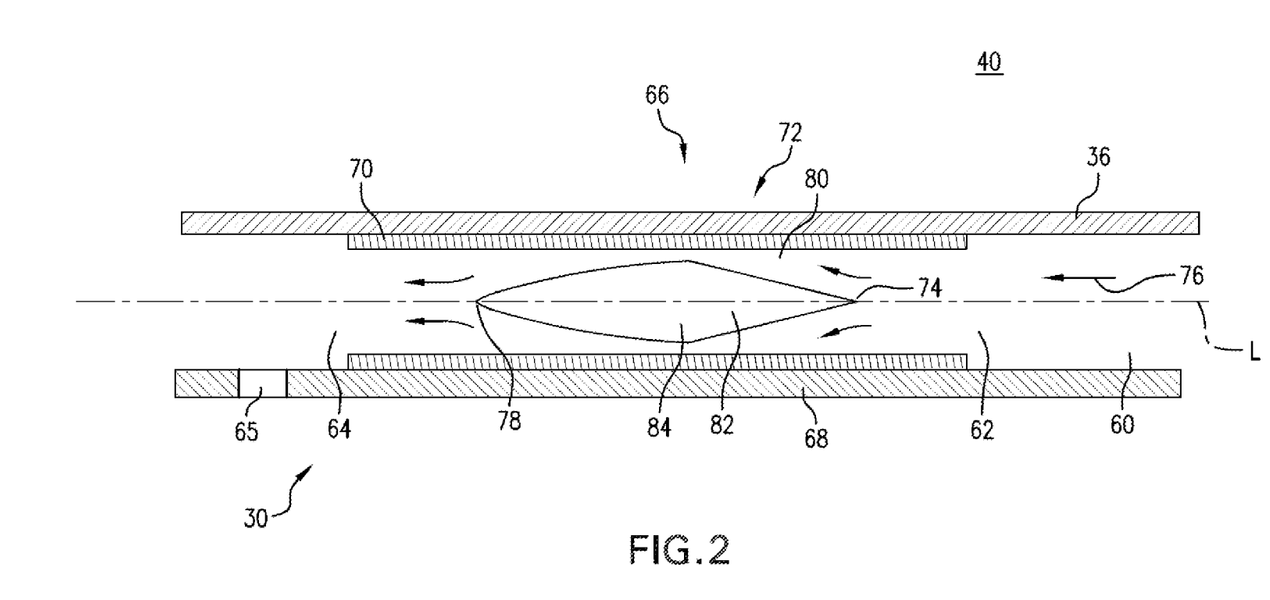
FIG. 2 depicts an embodiment of an annular flow control device including a flow control body disposed in a fluid channel.
Figure 3:
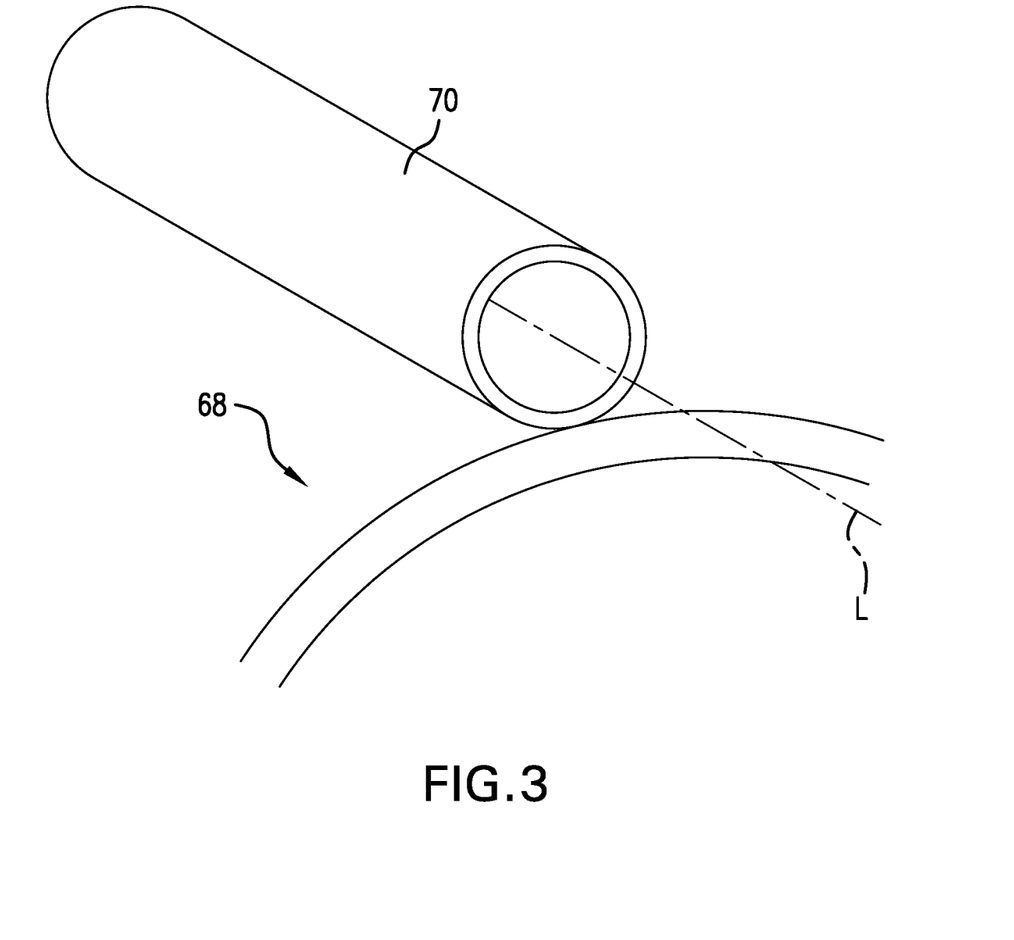
FIG. 3 is a perspective view of the flow control device of FIG. 2.

Referring to FIGS. 2 and 3, an embodiment of the flow control device 40 includes a fluid channel 60 having an inlet 62 and an outlet 64. In one embodiment, the inlet 62 is in fluid communication with fluid in an annulus 66 of the second borehole 14 and the outlet 64 is in fluid communication with the production conduit 30. For example, the outlet 64 is in fluid communication with the production conduit 30 via a fluid port 65. The flow control device 40, in one embodiment, is configured as an inflow control device (ICD) as part of a SAGD system. The flow control device 40 is not so limited, and can be utilized in conjunction with any energy industry system or other system for which fluid flow control is desired. An example of such a system is a geothermal energy recovery system.

In one embodiment, the fluid channel 60 is a tubular channel that directs fluid along a linear or axial path. For example, as shown in FIGS. 2 and 3, the fluid channel 60 has a longitudinal axis L configured as a linear axis. In this example, the fluid channel can be mounted longitudinally along a downhole component, so that the axis L is at least partially parallel to a longitudinal axis of the component. An example of a component is a base pipe 68 in the collector 34, although the component may be any suitable component, such as a coupling or production string.

The fluid channel 60 is not so limited and can extend in any suitable direction. For example the fluid channel can follow a nonlinear path (i.e., the longitudinal axis L is non-linear), such as a curved, circumferential, circular, ring-shaped or spiral path. Such a nonlinear fluid channel may be incorporated, for example, into a flow control device that wraps circumferentially around the base pipe 68 or other downhole component.

The flow control device 40 may be attached or fixedly disposed on the base pipe 68 or other downhole component, or formed integrally with a downhole component. For example, as shown in FIG. 3, the fluid channel 60 is formed by a housing 70 mounted on the base pipe 68.

In one embodiment, the fluid channel 60 is a cylindrical channel having a circular cross-section relative to the axis L (in a plane normal to the axis L). However, the fluid channel 60 may have any suitable cross-sectional shape.

The flow control device 40 also includes a flow control body 72 having a leading end 74 that faces upstream relative to the direction of the flow of fluid 76 (e.g., the production fluid 32). The flow control body 72 also has a trailing end 78 facing downstream relative to the fluid flow direction.

The flow control body 72 is configured to establish an annular flow region 80 within the fluid channel 60 and between the flow control body 72 and a surface of the fluid channel 60. It is noted that, although the annular flow region of FIG. 2 is a continuous flow region, embodiments are not so limited. For example, the annular flow region may be multiple flow regions between the flow control body 72 and the fluid channel surface at a given axial location. In another example, the annular flow region may include multiple flow regions at different axial locations along the axis L.

The annular flow region may be fully annular (i.e., completely surrounding the flow control body 80) or partially annular. The annular flow region 80 establishes a restricted annular flow path for the fluid, which has a size that is less than the size of the fluid channel 60 upstream of the flow control body 72. As described herein, the "size" of a flow path or region may refer to a cross-sectional area (normal to the axis L), a width or other measure, which is reduced relative to the upstream fluid channel 60 so as to cause the fluid 76 flowing through the restricted annular flow path to increase in velocity and experience a localized pressure drop from an initial pressure of the fluid upstream of the flow control body 72 to a lower pressure. As the fluid 76 exits the restricted path, the fluid pressure recovers to the initial pressure or other pressure greater than the lower pressure.

The flow control body 72 and the fluid channel 60 have shapes and sizes configured to selectively choke the flow rate of fluid 76 entering the flow control device 40. Such selective choking is based on subcool, which regulates the thermal conformance of the well, reduces the steam-oil ratio and thereby improves overall production. The "subcool" of a fluid refers to a fluid temperature relative to the saturation temperature of the fluid at a given fluid pressure. Saturation properties of the fluid can be represented by a saturation curve plotted as a function of temperature and pressure. A fluid that exists on the saturation curve has some combination of vapor (steam and gas) and liquid. Fluid above the saturation curve is entirely in the liquid state, and is referred to as subcooled liquid. Embodiments described herein cause fluid to cavitate by reducing the pressure of the fluid via a restriction or restricted path. The restriction causes fluid velocity to increase until the pressure falls to a value at the saturation curve for a given temperature. In order to cause cavitation, the restriction has a minimum size or throat size selected based on the measured or anticipated pressure and temperature of fluid flowing into the restriction.

The size of the annular flow region 80 and associated annular flow paths (e.g., cross-section area or width) is selected based on the initial pressure and a given fluid temperature so that the pressure drop is sufficient to make the fluid pressure in the restricted paths less than or equal to the saturation pressure of the fluid 76 at the given fluid temperature. The pressure drop causes the fluid 76, which enters the fluid channel 60 in a liquid phase, to cavitate, resulting in a mixture of vapor and liquid. In one embodiment, the "size" of the restricted path refers to the size of the smallest part (the minimum size or throat) of the restricted path.

When the local pressure reaches a saturation pressure of the fluid 76, cavitation occurs and vapor is evolved in the fluid 76. The cavitation acts to reduce or choke the fluid flow rate. The velocity of the fluid 76 in the restricted paths is limited to the sonic velocity of the fluid 76. As the mixture of liquid and vapor exhibits a smaller sonic velocity than either liquid or vapor phase alone, the smaller sonic velocity limits the flow rate. Downstream of the flow control body 72, the pressure of the fluid 76 recovers and velocity decreases, with the fluid 76 returning to the liquid phase as long as the drawdown pressure is above the saturation pressure of the fluid 76.

In one embodiment, the flow control body 72 includes a diverging section 82 that extends from the leading end 74 in the direction of the axis L toward a central section 84 of the flow control body 72. The diverging section 82 is configured to converge the fluid 76 and direct the fluid 76 into the annular flow region 80. The flow control body 72 may also include a converging section 86, which may also establish an annular fluid path.

Referring to FIG. 2, in one embodiment, the flow control body 72 is a solid body in which the diverging section 82 forms a tapered conical shape that increases in width from the leading end 74 toward the central section 84. The annular flow region 80 may have a constant or substantially constant size over the length of the diverging section, or may have a variable size. For example, as shown in FIG. 2, the width gradually reduces to a minimum size that is selected based on the subcool of the fluid to cause cavitation.

The diverging section 82 is shown in FIG. 2 as having straight conical sides, but is not so limited. For example, the diverging region 82 may have non-linear sides, such as concave sides forming a concave conical shape or convex sides forming a convex conical shape.

As noted above, the flow control body 72 may have a converging section 86, which extends from the central section 86 to the trailing end 78. In one embodiment, the converging section 86 has a width that decreases as the flow control body 72 extends from the central section 84 to the trailing end 78. For example, the converging section is a conical section, which may have convex sides as shown in FIG. 2 or have sides with a different shape (e.g., straight or concave). It is noted that the diverging section 82 and/or the converging section 86 may terminate at a point or at another shape, such as a flat or rounded end.

Figure 4:
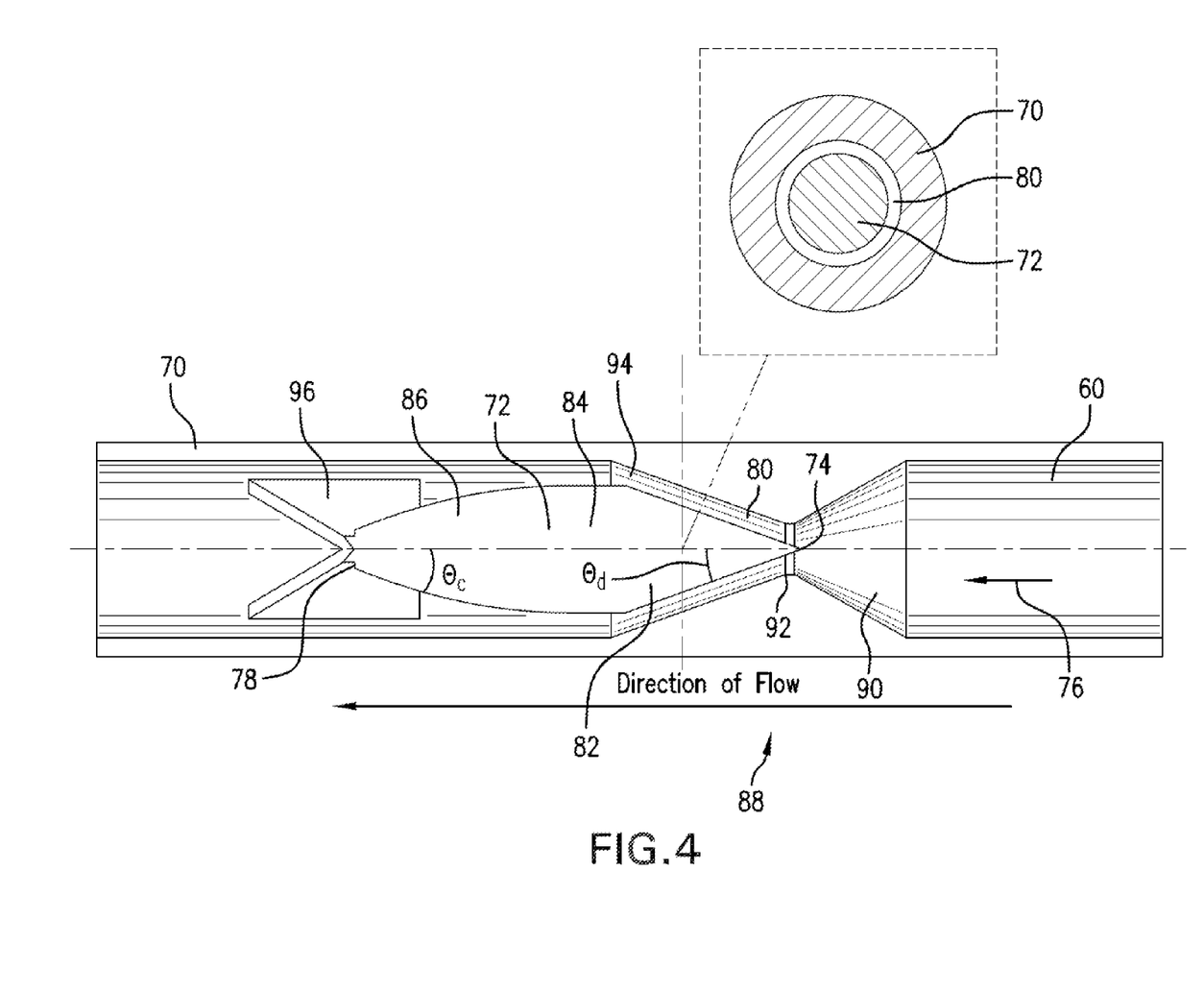
FIG. 4 depicts an embodiment of an annular flow control device.

Referring to FIG. 4, an embodiment of the flow control device 40 includes a fluid channel 60 that forms at least one restricted region 88, or region of the fluid channel 60 having a size that is less than the size of the fluid channel upstream the flow control body 72.

For example, the fluid channel 60 includes a first region 90 that decreases in size until the fluid channel 60 defines a throat region 92 having a selected throat size (e.g., width or diameter). The fluid channel 60 also includes a second region 94 that increases in size toward the trailing end 78 of the flow control body 72. The first and second regions 90 and 94, in one embodiment, are conical regions and the throat region 92 is a cylindrical region. The flow control body 72, disposed with its leading edge in and/or around the throat region 92, serves to gradually increase the flow area, improving pressure recovery while minimizing the length of the overall flow control device 40.

The flow control body 72 in this embodiment includes a conical diverging section 82 having a shape that corresponds to or is proportional to the shape of the restricted region 88. For example, the diverging section 82 forms a conical shape with straight sides, and the second region 94 also has a conical shape with straight sides, and has a size that is greater than the size of the diverging section 82 to establish a ring-shaped annular flow region 80 having a substantially constant size. The flow area (area normal to the axis L) gradually increases as the diverging section 82 increases in size.

The minimum size of the flow path (e.g., at the throat region 92) is selected based on the anticipated or known pressure differential and/or flow rate through the flow control device 40 and the downhole temperature of the fluid, and on the level of subcool of fluid entering the fluid channel. The flow control device 40, by virtue of the selected dimensions of the flow control body 72 and the minimum size, reacts to the level of subcool to cause a reduction of pressure sufficient to cause cavitation and thereby choke fluid flow. As fluid flows through the throat region 92, the pressure drops to a level along the saturation curve, and gradually recovers as the fluid fluids through the increasing flow area of the annular flow region 80. It is noted that the minimum size of the flow path (the throat) can be adjusted based on the axial position of the flow control body 72 and/or the leading end 74 relative to the throat region 92. For example, the minimum size can be decreased by positioning the leading end 74 so that a portion of the diverging section 82 is within the throat region 92.

As shown in FIG. 4, the diverging section 82 and the second region 94 form an annular flow region 80 that has a substantially constant size along a selected length of the fluid channel. The substantially constant annular flow region 80 may have any suitable length and/or location along the fluid channel.

The flow control body 72 of FIG. 4 has a converging section 86 that forms a converging annular flow path that directs the fluid 76 after cavitation to an increasingly larger flow area, to allow the fluid 76 to recombine and return to a liquid state. The converging section 86 may have flat sides, forming a conical shape with linear sides, or as shown in FIG. 4, may have non-linear sides such as convex sides. The converging section 86 may instead or in addition have convex sides or sides forming any suitable shape.

The flow control body 80 may include additional features to facilitate fluid control. For example, the flow control body includes one or more fluid control fins 96 that can facilitate choking the fluid flow and/or recombining the fluid 76. The fins 96 can be configured to, for example, to control the flow rate of fluid as the fluid advances downstream of the flow control body 80.

The diverging section 82 and the converging section 86, in one embodiment, form tapered shapes. For example, as shown in FIG. 4, the diverging section 82 tapers from the central section 84 toward the leading end 74 according to a selected angle or angles. For example, the diverging section 82 tapers by an angle $\theta_d$ relative to the longitudinal axis L. An example of the angle $\theta_d$ is about 10 to 25 degrees, such as at least about 18 degrees.

The converging section in the embodiment of FIG. 4 tapers from the central section 84 toward the trailing edge 78 according an angle $\theta_c$ or range of angles relative to the axis L. The angle $\theta_c$ (or range of angles) may be less than the diverging angle $\theta_d$, which provides for a longer converging region to allow for a relatively gradual pressure recovery. An example of the angle $\theta_c$ is about 10 to 25 degrees. If the converging section 86 has convex or arcuate sides, the angle may increase from zero at the central section to a selected angle at the trailing end (e.g., 18 degrees). The angle $\theta_c$ of a non-linear converging section and/or the angle $\theta_d$ of a non-linear diverging section may be defined as the average or median angle.

The various surfaces of the flow control body 72 and/or the fluid channel 60 that come into contact with the fluid 76 may have a selected roughness, so that the surfaces are smooth and do not significantly contribute to changing or reducing fluid velocity. For example, the surfaces can be polished or buffed to a selected roughness or coated with a material having a selected roughness. An example of the selected roughness is about 63 Root Mean Square (RMS) roughness or lower.

Figure 5:
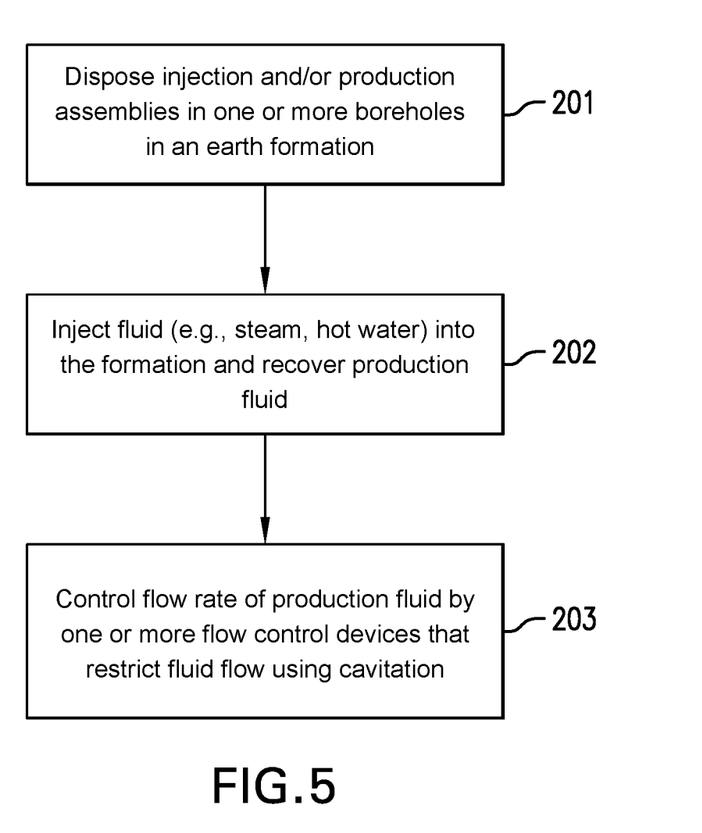
FIG. 5 is a flow diagram depicting an embodiment of a method of production by a resource recovery and production system.

Referring to FIG. 5 and with continued reference to FIGS. 1 and 2, a method 200 of producing a target resource such as hydrocarbons from a resource bearing formation includes one or more stages 201-203. In one embodiment, the method 200 includes the execution of all of stages 201-203 in the order described. However, certain stages may be omitted, stages may be added, or the order of the stages changed. Although the method 200 is described in conjunction with the system 10 and the injection and production assemblies described herein, the method 200 may be utilized in conjunction with any production system that incorporates injection of fluids for facilitating production.

In the first stage 201, the injection assembly 18 is disposed in the first borehole 12, and advanced through the first borehole 12 until the injector 24 is located at a selected location. The production assembly 26 is disposed in the second borehole 14, and advanced through the second borehole 14 until the collector 34 is positioned at a selected location. In one embodiment, the selected location is directly below, along the direction of gravity, the injector 24.

In the second stage 202, a fluid is injected into a region of the formation surrounding the first borehole 12 via the injection assembly 18 to facilitate production. Examples of injected fluid include water, steam, hydrocarbons, hot water, brine, acid, hydraulic fracturing fluid, gases and thermal fluids. In an embodiment, the injected fluid is steam, which is injected to reduce a viscosity of hydrocarbon material such as bitumen. The hydrocarbon material migrates with the force of gravity to a region of the formation surrounding the second borehole 14, and is recovered as production fluid through openings 72 in collector 34.

In the third stage 203, the flow rate of production fluid entering the collector 34 is controlled by one or more flow control devices 40 based on the subcool of production fluid as described above. For example, the collector 34 includes one or more flow control devices 40 including one or more flow control bodies, such as the flow control body 72 of FIG. 2 or FIG. 4. Each flow control body 72 forces fluid radially outwardly (e.g., with a directional component perpendicular to the axis L) into an annular flow path that causes the fluid to drop in pressure to the saturation pressure of the fluid at a temperature of the production fluid, to cause cavitation. The fluid flow is reduced by virtue of the cavitation (and potentially other factors such as surface roughness and the geometry of a fluid channel and flow control body), recombined and then directed into a production conduit in the collector 34. The flow control devices 40 may be incorporated in one or more inflow control devices (ICDs), such as an autonomous ICD that reacts to fluid subcool conditions.

It is noted that multiple flow control devices 40 can be located with the collector. For example, multiple flow control devices 40 can be arrayed circumferentially and/or longitudinally along the collector 34. The multiple flow control devices may have the same or similar configuration to choke fluid flow at a temperature or temperatures at the collector 34. Alternatively, different flow control devices 40 can have flow control bodies with different configurations. For example, temperature and/or pressure may vary along the collector 34. The flow control devices 40 can thus have different configurations (e.g., different minimum sizes of the restricted fluid paths) in order to choke fluid flow by a selected amount at different temperatures and/or pressures.

The flow control device 40 redirects heat to create even thermal profiles, reducing steam-generating hotspots and sending heat to low-producing cold zones. In addition, the flow control device 40 can operate completely in the subcool regime, so that there is no need to have vapor in the production fluid prior to entering the flow control device 40 to achieve a choking effect.

Embodiments described herein present a number of advantages and technical effects. SAGD wells suffer from steam breakthrough issues due to thermal non-conformance in the reservoir, due to a number of factors. This produced steam damages downhole equipment and limits the rate at which hydrocarbons can be produced. Embodiments described herein provide for controlling or choking flow based on subcool, which regulates the thermal conformance of a well and reduces the steam-oil ratio, thereby improving overall production.

Furthermore, the annular flow paths defined by embodiments described herein allow for a desired minimum flow path size (to induce cavitation) with fewer wall effects than other configurations. In addition, embodiments described herein can be manufactured more easily and take up less space than typical flow control devices and systems.

Set forth below are some embodiments of the foregoing disclosure:

Embodiment 1: A fluid control device comprising: a housing; a fluid channel defined within the housing, the fluid channel having an inlet; and a flow control body disposed in the fluid channel, the flow control body tapering towards the inlet; the flow control body, in use, causing a fluid flowing through the fluid channel to flow into an annular fluid flow path within the fluid channel, the annular fluid flow path having a geometry selected based on a subcool of the fluid at a pressure of the fluid entering the fluid channel, the geometry selected to induce cavitation of the fluid to choke fluid flow through the fluid channel.

Embodiment 2: The device of any prior embodiment, wherein the fluid channel and the diverging section are cylindrical and form a ring-shaped annular fluid path.

Embodiment 3: The device of any prior embodiment, wherein the flow control body includes an annular diverging section having a width that increases from a leading end facing upstream relative to a fluid flow direction toward a trailing end facing downstream relative to the fluid flow direction.

Embodiment 4: The device of any prior embodiment, wherein the diverging section of the flow control body has a conical shape.

Embodiment 5: The device of any prior embodiment, wherein the fluid channel has a first region that converges along the fluid flow direction to a throat region and decreases in area with decreasing distance from the throat region, and a second region that diverges from the throat region, the annular diverging section of the flow control body, in use, being positioned within the second region to cause the annular fluid flow path to increase in area with increasing distance from the leading end.

Embodiment 6: The device of any prior embodiment, wherein the diverging section of the flow control body is a conical diverging region, and the second region of the fluid channel has a conical shape.

Embodiment 7: The device of any prior embodiment, wherein the flow control body includes a converging section between the diverging section of the flow control body and the trailing end, the converging section having a convex conical shape.

Embodiment 8: The device of any prior embodiment, wherein the converging section of the flow control body includes at least one fluid control fin at the trailing end.

Embodiment 9: The device of any prior embodiment, wherein the flow control body includes a converging section between the diverging section and the trailing end, the converging section forming an annular converging flow path in fluid communication with the fluid channel downstream of the flow control body.

Embodiment 10: The device of any prior embodiment, wherein at least one of a surface of the fluid channel and a surface of the flow control body have a surface roughness that is less than a threshold roughness, the threshold roughness selected to maintain fluid velocity to a level sufficient to achieve cavitation.

Embodiment 11: The device of any prior embodiment, wherein the fluid control device is at least part of an inflow control device configured to be disposed in a borehole, the inflow control device configured to receive production fluid.

Embodiment 12: The device of any prior embodiment, wherein the inflow control device is part of at least one of a steam assisted gravity drainage (SAGD) system and a geothermal system.

Embodiment 13: A method of controlling fluid flow, comprising: receiving fluid in a liquid state at an inlet of a fluid channel in a housing of a flow control device, the fluid channel defined within the housing; causing, by the flow control body, fluid flowing through the fluid channel to diverge into an annular fluid flow path within the fluid channel, the annular fluid flow path having a geometry selected based on a subcool of the fluid at a pressure of the fluid entering the fluid channel, the geometry selected to induce cavitation of the fluid to choke fluid flow through the fluid channel.

Embodiment 14: The method of any prior embodiment, further comprising causing, by the flow control body, the fluid in the annular fluid flow path to converge the fluid into the fluid channel downstream of the flow control body via an annular converging flow path, and outputting the fluid to a production conduit in the borehole.

Embodiment 15: The method of any prior embodiment, wherein the fluid channel and the diverging section are cylindrical and form a ring-shaped annular fluid path.

Embodiment 16: The method of any prior embodiment, wherein the diverging section of the flow control body has a width that increases from the leading end toward the trailing end.

Embodiment 17: The method of any prior embodiment, wherein the diverging section of the flow control body has a conical shape.

Embodiment 18: The method of any prior embodiment, further comprising directing the fluid to a first region of the fluid channel that converges the fluid along the fluid flow direction to a throat region, the first region decreasing in area with decreasing distance from the throat region, and subsequently causing the fluid to diverge from the throat region into an annular diverging fluid path that increases in area with increasing distance from the leading end.

Embodiment 19: The method of any prior embodiment, wherein the annular diverging fluid flow path is defined by second region and a conical diverging section of the flow control body.

Embodiment 20: The method of any prior embodiment, further comprising directing the fluid from the annular diverging fluid flow path to a converging flow path defined at least by a converging section of the flow control body, the converging section having a convex conical shape.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluid control device comprising:
   a housing;
   a fluid channel defined within the housing, the fluid channel having an inlet; and
   a flow control body disposed in the fluid channel, the flow control body having a diverging section tapering towards the inlet to a leading end facing upstream relative to a fluid flow direction, and a converging section between the diverging section of the flow control body and a trailing end of the body facing downstream relative to the fluid flow direction;
   the flow control body, in use, causing a fluid flowing through the fluid channel to flow into an annular fluid flow path defined by the diverging section within the fluid channel, the annular fluid flow path having a geometry selected based on a subcool of the fluid at a pressure of the fluid entering the fluid channel, the geometry selected to induce cavitation of the fluid to choke fluid flow through the fluid channel.

2. The device of claim 1, wherein the fluid channel and the diverging section are cylindrical and form a ring-shaped annular fluid path.

3. The device of claim 1, wherein the diverging section includes an annular diverging section having a width that increases from the leading end facing upstream relative to the fluid flow direction toward the trailing end facing downstream relative to the fluid flow direction.

4. The device of claim 3, wherein the diverging section of the flow control body has a conical shape.

5. The device of claim 3, wherein the fluid channel has a first region that converges along the fluid flow direction to a throat region and decreases in area with decreasing distance from the throat region, and a second region that diverges from the throat region, the annular diverging section of the flow control body, in use, being positioned within the second region to cause the annular fluid flow path to increase in area with increasing distance from the leading end.

6. The device of claim 5, wherein the diverging section of the flow control body is a conical diverging region, and the second region of the fluid channel has a conical shape.

7. The device of claim 6, wherein the converging section has a convex conical shape.

8. The device of claim 7, wherein the converging section of the flow control body includes at least one fluid control fin at the trailing end.

9. The device of claim 1, wherein the converging section forms an annular converging flow path in fluid communication with the fluid channel downstream of the flow control body.

10. The device of claim 1, wherein at least one of a surface of the fluid channel and a surface of the flow control body have a surface roughness that is less than a threshold roughness, the threshold roughness selected to maintain fluid velocity to a level sufficient to achieve cavitation.

11. The device of claim 1, wherein the fluid control device is at least part of an inflow control device configured to be disposed in a borehole, the inflow control device configured to receive production fluid.

12. The device of claim 1, wherein the inflow control device is part of at least one of a steam assisted gravity drainage (SAGD) system and a geothermal system.

13. A method of controlling fluid flow, comprising:
   receiving fluid in a liquid state at an inlet of a fluid channel in a housing of a flow control device, the fluid channel defined within the housing, the flow device including a flow control body having a diverging section tapering towards the inlet to a leading end facing upstream relative to a fluid flow direction, and a converging section between the diverging section of the flow control body and a trailing end of the body facing downstream relative to the fluid flow direction;
   causing, by the flow control body, fluid flowing through the fluid channel to diverge into an annular fluid flow path within the fluid channel, the annular fluid flow path defined by the diverging section and having a geometry selected based on a subcool of the fluid at a pressure of the fluid entering the fluid channel, the geometry selected to induce cavitation of the fluid to choke fluid flow through the fluid channel.

14. The method of claim 13, further comprising causing, by the flow control body, the fluid in the annular fluid flow path to converge the fluid into the fluid channel downstream of the flow control body via an annular converging flow path, and outputting the fluid to a production conduit in a borehole.

15. The method of claim 13, wherein the fluid channel and the diverging section are cylindrical and form a ring-shaped annular fluid path.

16. The method of claim 13, wherein the diverging section of the flow control body has a width that increases from the leading end toward the trailing end.

17. The method of claim 16, wherein the diverging section of the flow control body has a conical shape.

18. The method of claim 16, further comprising directing the fluid to a first region of the fluid channel that converges the fluid along the fluid flow direction to a throat region, the first region decreasing in area with decreasing distance from the throat region, and subsequently causing the fluid to diverge from the throat region into an annular diverging fluid path that increases in area with increasing distance from the leading end.

19. The method of claim 18, wherein the annular diverging fluid flow path is defined by second region and a conical diverging section of the flow control body.

20. The method of claim 19, further comprising directing the fluid from the annular diverging fluid flow path to a converging flow path defined at least by a converging section of the flow control body, the converging section having a convex conical shape.

* * * * *